(12) United States Patent
Newham

(10) Patent No.: US 9,191,988 B2
(45) Date of Patent: Nov. 17, 2015

(54) SMART PAIRING USING BLUETOOTH TECHNOLOGY

(75) Inventor: Adam E. Newham, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 13/481,829

(22) Filed: May 26, 2012

(65) Prior Publication Data

US 2013/0316649 A1 Nov. 28, 2013

(51) Int. Cl.
*H04W 88/04* (2009.01)
*H04W 84/18* (2009.01)
*H04W 8/00* (2009.01)
*H04L 29/06* (2006.01)

(52) U.S. Cl.
CPC ........... *H04W 88/04* (2013.01); *H04L 63/0281* (2013.01); *H04W 8/005* (2013.01); *H04W 84/18* (2013.01)

(58) Field of Classification Search
CPC ... H04W 84/18; H04W 76/02; H04W 84/027; H04W 88/02; H04W 8/005; H04M 1/7253; H04M 1/72563; H04M 1/72583
USPC .............................................. 455/41.2, 41.3
See application file for complete search history.

(56) References Cited

U.S. PATENT DOCUMENTS

| 7,706,750 | B2 | 4/2010 | Dandekar et al. | |
|---|---|---|---|---|
| 7,778,601 | B2 | 8/2010 | Seshadri et al. | |
| 7,996,496 | B2 | 8/2011 | Haartsen et al. | |
| 7,996,571 | B2 | 8/2011 | Salokannel | |
| 2007/0141987 | A1* | 6/2007 | Weinans et al. | 455/41.2 |
| 2008/0167078 | A1* | 7/2008 | Eibye | 455/566 |
| 2009/0061769 | A1 | 3/2009 | Zimbric et al. | |
| 2010/0240345 | A1 | 9/2010 | Karrman et al. | |
| 2010/0304674 | A1* | 12/2010 | Kim et al. | 455/41.2 |
| 2011/0009059 | A1* | 1/2011 | Camp et al. | 455/41.2 |
| 2011/0059769 | A1* | 3/2011 | Brunolli | 455/556.1 |
| 2012/0044062 | A1 | 2/2012 | Jersa et al. | |

FOREIGN PATENT DOCUMENTS

| WO | 2004004229 A2 | 1/2004 |
|---|---|---|
| WO | 2007068300 A1 | 6/2007 |
| WO | 2011031910 A1 | 3/2011 |

OTHER PUBLICATIONS

Yanz, et al., "The Ongoing Evolution fo Bluetooth in Hearing Care," Techtopic, Issue: Aug. 2006.
International Search Report and Written Opinion—PCT/US2013/038208—ISA/EPO—Jul. 23, 2013.

* cited by examiner

*Primary Examiner* — Lewis West
(74) *Attorney, Agent, or Firm* — Ryan N. Farr

(57) ABSTRACT

Various embodiments provide systems and methods among wireless nodes in a wireless communication network that enable pairing a third-party device to all wireless devices of a composite electronic device in a single user step. A first wireless node may negotiate a first wireless pairing with third-party device for a second wireless node, and pairing information may be relayed to the second wireless node to enable the second wireless node to communicate with the third-party device as if the second wireless node had itself directly negotiated the wireless pairing.

27 Claims, 10 Drawing Sheets

SMART PAIRING USING BLUETOOTH TECHNOLOGY

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become smaller, more powerful and more feature-rich than ever. Many of these devices now have impressive processing capabilities, large memories, and radios/circuitry for wirelessly sending and receiving information.

Wireless communication technologies have also improved over the past several years. Wireless local area networks are now replacing wired networks in many homes and offices. Short-range wireless technologies, such as Bluetooth® and WiFi, enable high speed communications between mobile electronic devices (e.g., cellular phones, watches, headphones, remote controls, etc.) that are within a relatively short distance of one another (e.g., 100 meters or less).

SUMMARY

The various embodiments include methods for enabling one device to accomplish pairing for another one or more wireless nodes with a source device in a wireless communication network. In an embodiment, the method may include a first wireless node negotiating a wireless pairing with the source device on behalf of a second wireless node and relaying the resulting pairing information from the first wireless node to the second wireless node so that the relayed pairing information enables the second wireless node to communicate with the source device as if the second wireless node had directly negotiated the wireless pairing with the source device. The first wireless node can negotiate pairings for other wireless nodes with the source device using by identifying itself as another wireless node and negotiating each pairing individually, or by identifying to the source device characteristics of other wireless nodes and negotiating all of the pairings in the same process. In an embodiment, negotiating a wireless pairing with the source device on behalf of a second wireless node may include the first wireless node identifying itself to the source device as being the second wireless node, and the first wireless node negotiating the wireless pairing with the source device as if the first wireless node were the second wireless node.

In another embodiment, negotiating a wireless pairing with the source device on behalf of a second wireless node may include the first wireless node transmitting to the source device a data structure identifying a plurality of wireless nodes including the second wireless node, the first wireless node receiving pairing information for each of the plurality of wireless nodes identified in the data structure, and the first wireless node transmitting to each of the plurality of wireless nodes identified in the data structure its respective pairing information. In a further embodiment, the method may include the first wireless node and the source device cooperating in negotiating pairing information for each of the plurality of wireless nodes identified in the data structure. In various embodiments the first wireless node may negotiate pairings with the source node over an of a variety of communication links, including a direct wired connection (e.g., USB) and wireless communication links, including a Bluetooth® link, a WiFi link, a near-field communication (NFC) link, and a Zigbee® link. In embodiments in which the pairings are negotiated over a Bluetooth® communication link, the first wireless node and the source node may negotiate that pairing before negotiating pairings on behalf of other wireless nodes. In a further embodiment, negotiating a wireless pairing with the source device on behalf of a second wireless node may include negotiating a Bluetooth® wireless pairing. In further embodiments, the first wireless node may be a Bluetooth®-enabled wrist display, the source device may be a Bluetooth®-enabled mobile phone, and/or the second wireless node may be a Bluetooth®-enabled wireless earpiece.

Further embodiments include methods of pairing a first wireless node to a second wireless node, which may include negotiating a first wireless pairing between the first wireless node and a third wireless node, negotiating a second wireless pairing between the second wireless node and the third wireless node, displaying information identifying the first and second wireless nodes on a graphical user interface (GUI) of the third wireless node, receiving user input selecting the first and second wireless nodes on the GUI of the third wireless node, and in response to the user input, negotiating a third wireless pairing between the first and second wireless nodes. In an embodiment, negotiating a third wireless pairing between the first and second wireless nodes may include relaying pairing information relating to the third wireless pairing from the first wireless node to the second wireless node, the relayed pairing information enabling the second wireless node to communicate with the first wireless node as if the second wireless node had directly negotiated the third wireless pairing with the first wireless node.

Further embodiments include a computing device having a processor configured with processor-executable instructions to perform various operations corresponding to the methods discussed above.

Further embodiments include a communication system including a first wireless node having a first processor, a second wireless node having a second processor, and a third wireless node having a graphical user interface (GUI), any or all of which may be configured to perform operations corresponding to the methods discussed above.

Further embodiments include a computing device having various means for performing functions corresponding to the method operations discussed above.

Further embodiments include a communication system including a first wireless node, a second wireless node, a third wireless node, and various means for performing functions corresponding to the method operations discussed above.

Further embodiments include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
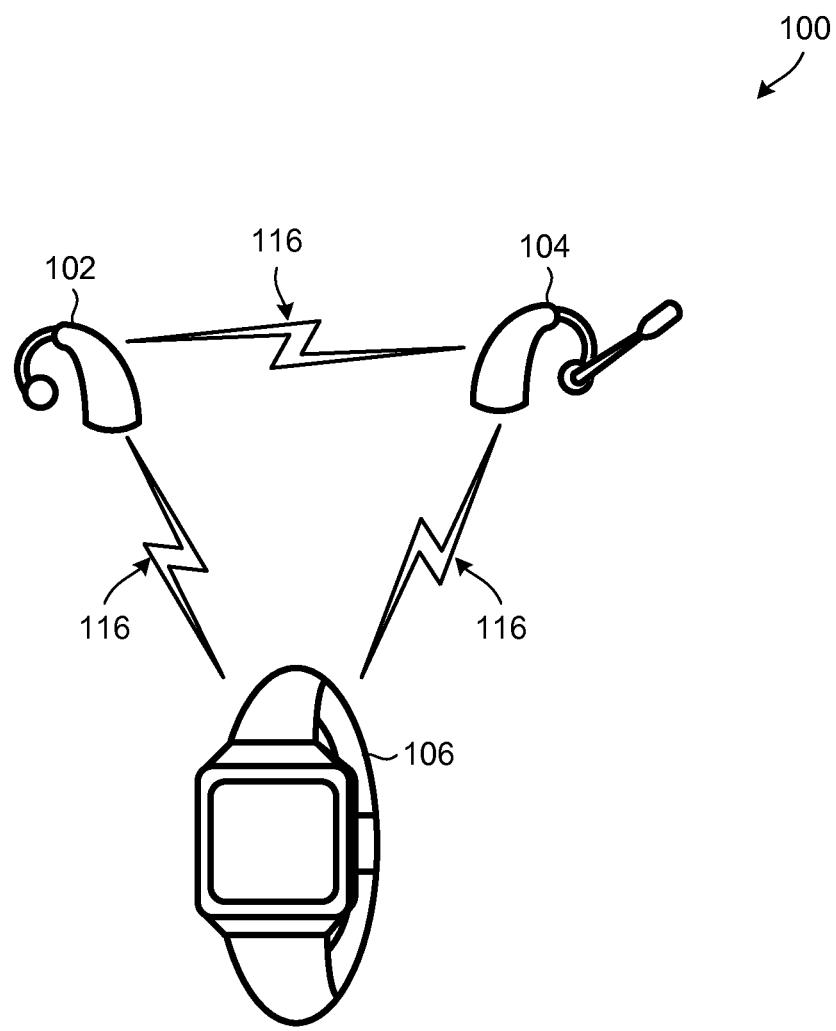
FIG. 1 is a component block diagram illustrating example wireless devices and communication links in composite electronic device suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

The terms "mobile device," "receiver device," "wireless device," and "wireless node" are used interchangeably herein to refer to any electronic device that includes circuitry for wirelessly sending and/or receiving information, including any one or all of cellular telephones, personal or mobile multi-media players, watches, wrist displays, medical devices, headsets, headphones, speakers, microphones, and other similar electronics.

The term "Bluetooth®-enabled device" is used herein to refer to any electronic device that includes a radio frequency (RF) radio and a processor or circuitry for implementing the Bluetooth® protocol stack/interface. Bluetooth® is an open standard for short-range radio frequency (RF) communication. Details of the Bluetooth® standards, interfaces, and technology are set forth in Bluetooth® Special interest Group (SIG) Specification of the Bluetooth® System Version 4.0 Jun. 30, 2010, which is herein incorporated by reference in its entirety.

As mobile device and wireless technologies continue to improve and grow in popularity, short-range wireless technologies are expected to supplant or replace the need for connecting devices together using cables or wires. As part of this evolution, composite electronic devices made up of multiple independent wireless-enabled devices (e.g., two headphones and a wrist display) are beginning to emerge, and it is becoming more common for individual electronic wireless devices (e.g., a headphone) to require short-range wireless communications with multiple wireless devices/devices. Since wireless communications can expose private data, short-range wireless technologies may require that the devices first establish a "trust relationship" before they are allowed to connect to one another. This often requires that the user authenticate or pair the devices by inputting a code or number into one or more of the devices.

Composite electronic devices may be pre-configured at the factory so that a trust relationship exists between each individual wireless device (e.g., left earpiece), allowing the individual wireless devices to communicate wirelessly without requiring any additional user configuration or input. A user may simply purchase the composite electronic device and begin using it as if all the wireless devices were connected to each other with wires. However, communications with third-party devices (e.g., a phone, media player, etc.) may still require some form of user configuration or input, typically as part of the authentication or pairing processes. In some cases, the user may be required to individually pair each wireless device in the composite device to the third-party device.

Repeatedly performing the authentication/pairing process for each wireless device in a composite electronic device may degrade the user experience by being tedious and introducing additional opportunities for user error (e.g., incorrect input of password). As composite electronic devices continue to grow in complexity (e.g., number of constituent wireless devices), reducing the complexity of the authentication or pairing process is becoming an important design criterion.

The various embodiments provide methods for pairing multiple wireless-enabled devices in a single operation so that the user perceives only a single pairing action. The pairing operations may be performed so that all of the individual wireless devices of a composite device (e.g., left earpiece, right earpiece, wrist display) are paired to a third-party device (e.g., a cell phone, media player, etc.) in a single user step. Some embodiment methods include accomplishing multiple pairings by one device "spoofing" other devices to complete pairings with the third-party device operations, in which a first wireless device (e.g., a wrist display) pretends to be a second wireless device (e.g., a left earpiece) to establish a pairing to the third-party device (e.g., phone) on behalf of the second wireless device (e.g., a left earpiece). Other embodiments may perform "proxy" pair operations, in which the first wireless device (e.g., a wrist display) negotiates a connection with the third-party device (e.g., a cell phone) on behalf of the second wireless device (e.g., a left earpiece). In the various embodiments, the first wireless device forwards to the second wireless device pairing information that the second wireless device needs to communicate with the third-party device.

The various embodiments may be implemented in communication networks using a variety of communication protocols, but are described herein using Bluetooth® and Bluetooth®-related terminology as a convenient example of a communications technology for wirelessly connecting electronic devices located within a relatively short distance of one another (e.g., 100 meters). However, the examples referring to Bluetooth®, and other references to the Bluetooth® herein, are for illustration purposes only, and are not intended to limit the descriptions or the claims to that particular standard. Therefore, the scope of the claims should not be construed as requiring Bluetooth® unless specifically recited in the claims.

Bluetooth® technology provides a secure way to connect and exchange information between electronic devices (e.g., headphones, cellular phones, watches, laptops, remote controls, etc.). Because many of the services offered over Bluetooth® can expose private data and/or allow the connecting party to control the connected device, Bluetooth® may require that devices first establish a "trust relationship" before they are allowed to connect to one another. This trust relationship may be established using a process called "bonding," in which a "bond" is created through a process called "pairing." Once the pairing process is successfully completed, a bond is formed between the two devices. This bond enables the devices to communicate with each other in the future without further authentication.

The pairing process may be triggered by a specific request to create a bond (e.g., user explicitly requests to "add a Bluetooth® device"), or may be triggered automatically (e.g., when connecting to a service). For example, a Bluetooth® device may automatically initiate the performance of the pairing operations each time the device is powered or moved within a certain distance of another Bluetooth® device. Pairing information relating to current and previously established pairings may be stored in a paired device list (PDL) in the memory of the Bluetooth® device. This pairing information may include a name field, an address field, a link key field, and other similar fields (e.g., profile type, etc.) useful for authenticating the device and/or establishing a Bluetooth® communications link.

Bluetooth® communications may require establishing wireless personal area networks (also referred to as "ad hoc" or "peer-to-peer" networks). These ad hoc networks are commonly called "piconets." Each device may belong to multiple piconets. Multiple interconnected piconets may be called scatternets. A scatternet may be formed when a member of a first piconet elects to participate in a second piconet.

A Bluetooth® profile describes general behaviors through which Bluetooth®-enabled devices communicate with other Bluetooth® devices. For example, the hands free profile (HFP) describes how a Bluetooth® device (e.g., phone) may place and receive calls for another Bluetooth® device, and the Advanced Audio Distribution Profile (A2DP) describes how stereo quality audio may be streamed from a first Bluetooth® device (e.g., phone) to another Bluetooth® device (e.g., headphones).

Bluetooth® devices may connect to two devices at a time using different Bluetooth profiles. For example, a Bluetooth® receiver device (e.g., headphones) may connect to two Bluetooth® sources devices (e.g., a phone and a media player) at the same time using the A2DP and HFP profiles. This allows the user to listen to music streamed from the first source device (e.g., media player) using A2DP while allowing the second source device to automatically interrupt the play of music to stream speech using HFP (e.g., in the event of an incoming telephone call), and automatically return to streaming music from the media player using A2DP.

Bluetooth® implements a master-slave structure in which a single master Bluetooth® device (referred to herein simply as the "master device") may communicate with up to seven active slave Bluetooth® devices (herein simply "slave devices") in a piconet. A master device may only communicate with the slave devices that are within the same piconet as the master. Slave devices may only communicate with the master device, and thus communications between two or more slave devices are typically facilitated by the master device.

Typically in each piconet, data may only be transferred over a single connection at a time, and the connection may only be established between the master device and one slave device. Therefore, the master device may be responsible for facilitating communications between two slave devices by receiving information from a sending slave device, identifying a target slave device, and retransmitting the information (or a portion of the information) to the identified target device. The master device may also be responsible for rapidly switching the connection from one slave device to another in a round-robin fashion in order to avoid starving or neglecting slave devices that need to send or receive information.

Wireless devices operating within a wireless network, such as a piconet, are often referred to as nodes within the network. Therefore, for ease of reference wireless devices negotiating and wireless pairings receiving are also referred to herein as wireless nodes.

As mentioned above, it is becoming more common for individual electronic devices to require Bluetooth® pairings with multiple wireless devices. Since wireless devices implementing Bluetooth® technologies have typically involved one-to-one communication links (e.g., phone and a headset, phone and car), the traditional pairing process is designed such that a user must perform the traditional pairing process individually for each Bluetooth® device to every other Bluetooth® device, repeating the same operations over and over. For example, in the traditional pairing process, if a user purchases a composite electronic device that includes multiple independent Bluetooth®-enabled wireless devices/nodes (e.g., two earpieces and a wrist display), that user would ordinarily be required to repeat the pairing process for each Bluetooth®-enabled wireless device to a third-party device (e.g., a cell phone, media player, etc.).

Pairings between the wireless devices that are sold together may be performed in advance (e.g., at the factory) because the composite electronic device may be designed, manufactured, or assembled by the same entity. However, communications with a third-party electronic device (e.g., phone, a media player, etc.) may require that each of the wireless devices (e.g., left earpiece, right earpiece, and wrist display) be manually paired to third-party device (e.g., phone, etc.). This may require that the user repeat the pairing operations for each wireless device in the composite electronic device, which may be tedious and introduces additional opportunities for user error (e.g., entry of incorrect passwords).

The various embodiments provide methods for simplifying the pairing of multiple Bluetooth® devices so that the user perceives only a single pairing operation being performed. Pairing operations may be performed so that all the individual wireless devices of a composite device (e.g., left earpiece, right earpiece, wrist display) are paired to the third-party device (e.g., phone, media player, etc.) in a single user step.

FIG. 1 is a component block diagram illustrating an example composite electronic device 100 suitable for use with the various embodiments. The composite electronic device 100 may include multiple wireless nodes, such as a left earpiece 102, a right earpiece 104, and a wrist display 106, each of which may be independently Bluetooth®-enabled. Each wireless device 102, 104, 106 may be individually paired to each of the other wireless devices via wireless communication links/pairings 116. These links/pairings 116 may be established at the factory so that the user perceives the composite electronic device 100 as a single wireless device.

In an embodiment, the wireless devices 102, 104, 106 may be coupled in an advanced audio distribution profile (A2DP) configuration.

Each earpiece 102, 104 may include a speaker for generating sounds in response to audio signals received from the wrist display 106, another earpiece 104, 102, or a Bluetooth®-enabled third-party device (e.g., phone). The wrist display 106 may include a media player that transmits audio and/or control streams to the earpieces 102, 104. In an embodiment, the wrist display 106 may transmit the audio and/or control streams to a first earpiece 102, 104, which may receive the wireless transmission and retransmit the same or similar streams to the second earpiece 104, 102. In an embodiment, the wrist display 106 may be configured to transmit audio and/or control streams to both the earpieces 102, 104. In an embodiment, the wrist display 106 may be configured to transmit both an audio data stream and a control stream to the earpieces 102, 104. In an embodiment, the audio or control stream may be transmitted via a separate out-of-band channel.

Figure 2:
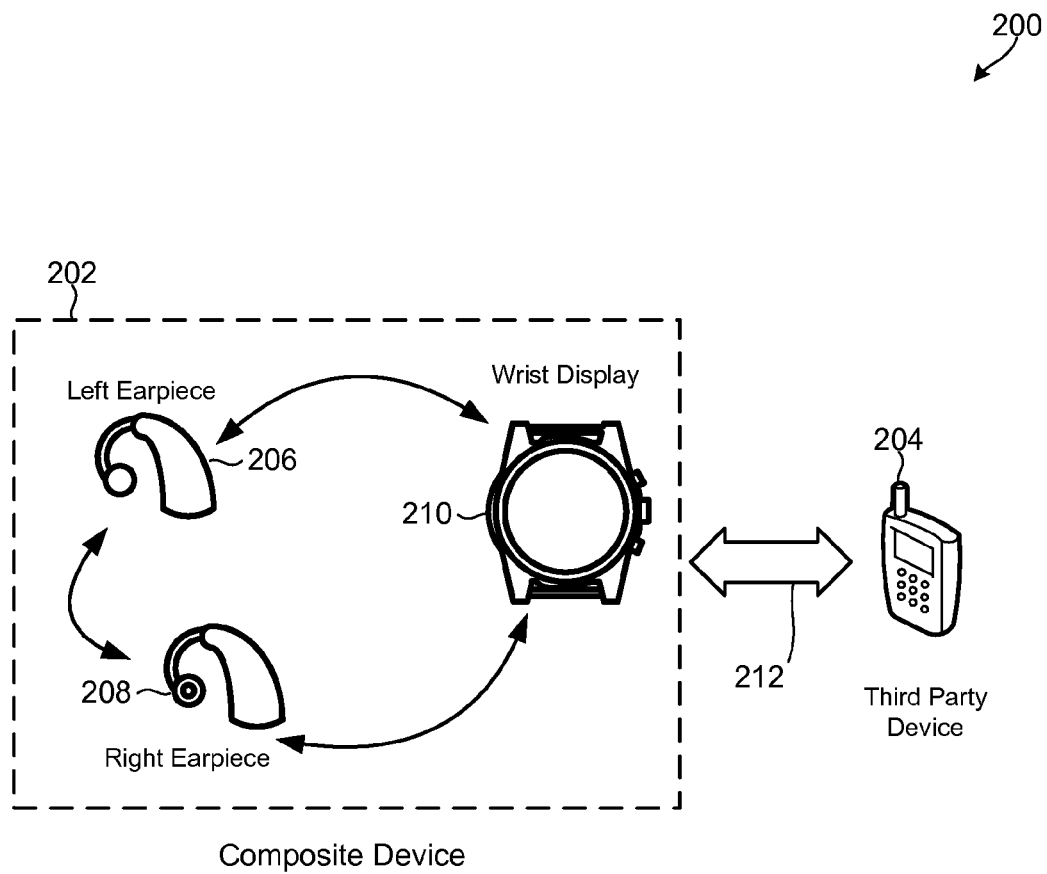
FIG. 2 is a component block diagram illustrating example pairings and wireless devices in a configuration suitable for implementing the various embodiments.

FIG. 2 is a block diagram illustrating example pairings and wireless devices in a configuration 200 suitable for implementing the various embodiments. In the illustrated example of FIG. 2, a composite electronic device 202 includes multiple independently Bluetooth®-enabled wireless devices, which include a wrist display 210, a left earpiece 206 and a right earpiece 208. The composite device 202 may communicate with a Bluetooth®-enabled third-party phone 204 via communication links/pairings 212. The links/pairings 212 may include a wireless communications link between two of the Bluetooth®-enabled wireless devices (e.g., phone 204, wrist display 210, left earpiece 206, right earpiece 208) for communicating information between the two connected devices.

As discussed above, Bluetooth® communications require that a trust relationship be established between the devices, which may be achieved via the pairing process. The Bluetooth®-enabled wireless devices 206, 208, 210 that make up the composite device 202 may be pre-paired at the factory. However, since the third-party phone 204 is not a part of the wireless device 202 (for instance, the device 204 may be sold separately), the wireless devices 210, 206, 208 need to be paired with the Bluetooth®-enabled third-party phone 204. The various embodiments address this step in configuring the wireless devices of the configuration 200.

Figure 3:
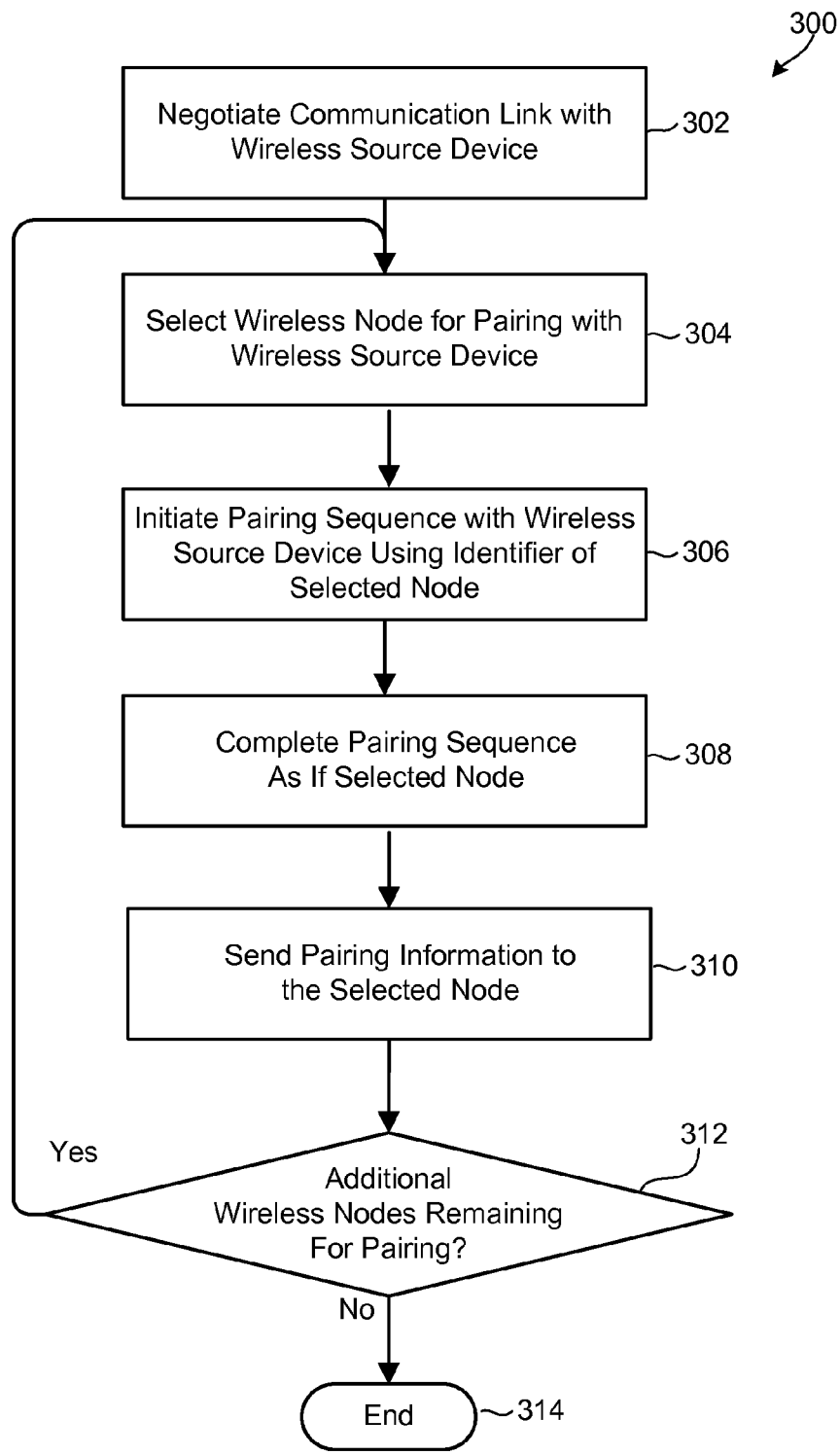
FIG. 3 is a process flow diagram of an embodiment wireless node method for pairing wireless devices with a third-party computing device.

FIG. 3 illustrates an embodiment method 300 for performing a single pairing sequence that pairs multiple nodes (or wireless devices) to a third-party device by one of the nodes pretending to be the other nodes and then relaying negotiated pairing information. The operations in method 300 may be accomplished by processors within each wireless node (e.g., left and right earpieces, wrist display, etc.) configured with processor-executable instructions implementing the method, so references to each wireless node encompass the processor within the node. In block 302, a first wireless node (e.g., a wrist display) may establish a first communication link with a wireless source device (e.g., phone) over which other pairings may be negotiated. In various embodiments the first wireless node and the source node may establish any of a variety of communication links, including a direct wired connection (e.g., USB) and wireless communication links, including a Bluetooth® link, a WiFi link, a near-field communication (NFC) link, and a Zigbee® link. In embodiments in which subsequent pairings are negotiated over a Bluetooth® communication link, the first wireless node and the source node may negotiate a Bluetooth® pairing to establish a first Bluetooth® connection in block 302. For example, this may be achieved by communicating with a software application executing on the wireless source device. In block 304, the first wireless node may select a second wireless node (e.g., left or right earpiece) that is not paired with the wireless source device for pairing with the wireless source device. In block 306, the first wireless node may initiate a pairing sequence with the wireless source device using an identifier of the selected wireless node. Thus, as part of block 306, the first wireless node may imitate, replicate, or otherwise "pretend to be" the selected node while negotiating a pairing or bond with the wireless source device. Thus, the first wireless node "spoofs" the wireless source device regarding its identity in order to negotiate pairings on behalf of the other nodes. In block 308, the first wireless node may complete the pairing sequence as if the first wireless node was the selected wireless node by completing the pairing sequence on behalf of the selected wireless node. In block 310, the first node may send the negotiated pairing information to the selected wireless node. This pairing information may include the same information that would have been received by each device if that device had accomplished the pairing sequence separately with the cell phone, and may include a name, address, and a link key.

As part of block 310, the selected node may receive pairing information from the first node, and store the pairing information in memory for use in establishing communication links and/or a trust relationship with the wireless source device. In determination block 312, the first node may determine whether there are additional nodes that require pairing. If there are additional nodes requiring pairing (i.e., determination block 312="Yes"), the first node may select another node in block 304, and repeat operations in blocks 306-312 as discussed above to complete the pairing process on behalf of the next selected node. Once all wireless nodes have been paired (i.e., determination block 312="No"), the smart pairing method may end in block 314.

In another embodiment, the Bluetooth® protocol implemented in the third-party device and nodes may be modified so that the first node openly executes the pairing sequences with the third-party device for itself and for each of the other nodes, and then relays the bond information to the respective nodes. In this embodiment, the first node may inform the third-party device of all the nodes to be paired, and then cooperate with the third-party device in accomplishing the multiple pairing negotiations in one set of operations. The relayed bond information may be the same information that would have been received by each device if it had accomplished the pairing sequence separately with the cell phone.

Figure 4A:
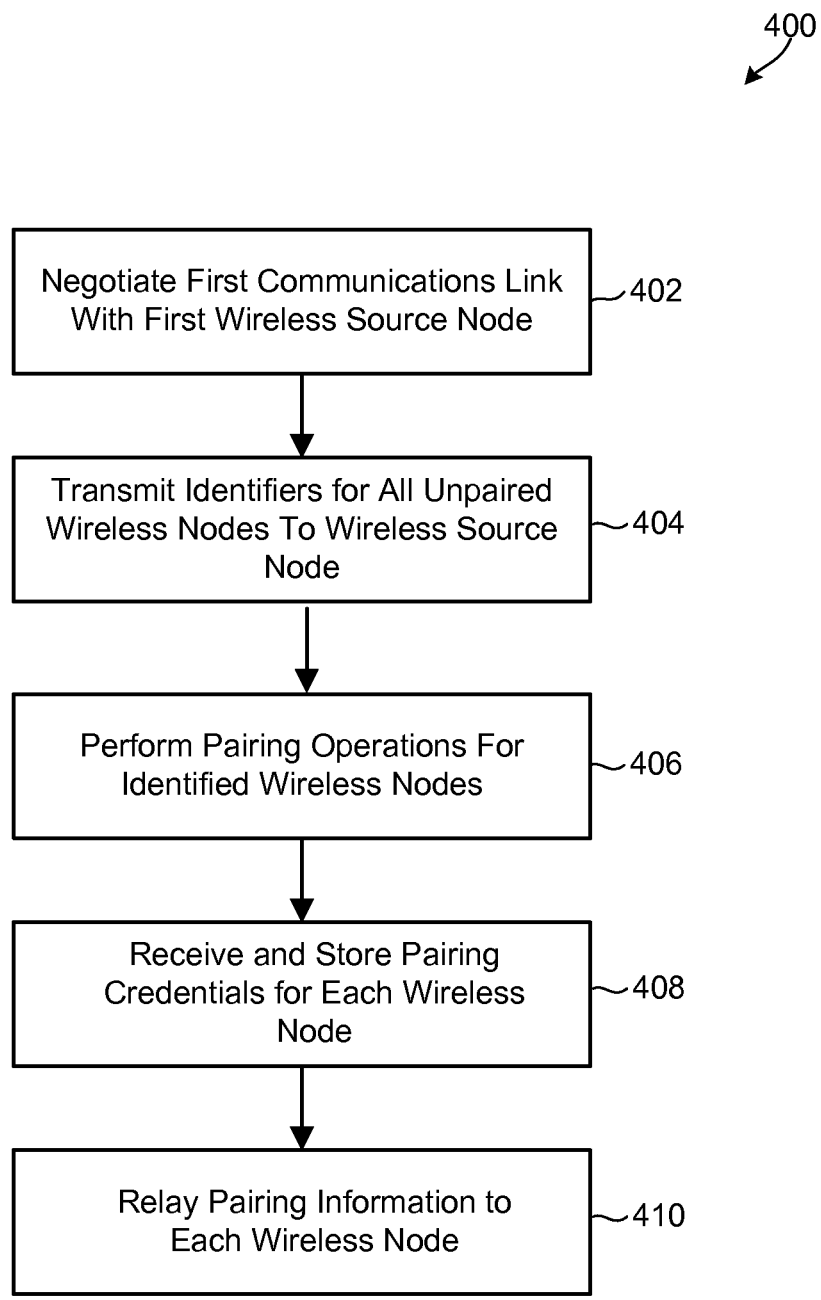
FIG. 4A is a process flow diagram of another embodiment wireless node method for pairing wireless devices with a third-party computing device.

FIG. 4A illustrates an embodiment method 400 for performing a single pairing operation that pairs multiple wireless devices (or nodes) to a third-party device without "spoofing." In block 402, a first wireless node (e.g., wrist display) may negotiate a first pairing and/or communications link with a wireless source node (e.g., a cell phone) to establish a wireless connection. This may be achieved by, for example, communicating with a software application executing on the wireless source device. In block 404, the first wireless node may transmit to the wireless source node a list or table of identifiers for all unpaired wireless devices for which pairing negotiations are desired. As part of block 404, the first wireless node may identify and select all wireless devices (e.g., left or right earpiece) that are not paired with the wireless source device, add the selected wireless devices to a data structure (e.g., table, list, etc.), and transmitting the data structure to the wireless source device to inform the wireless source device of the wireless devices that are to be paired.

In block 406, the first wireless node may perform cooperative pairing operations on behalf of the unpaired wireless nodes by, for example, cooperating with an application on the wireless source device to establish pairings on behalf of all the wireless nodes identified in the table or list communicated to the wireless source device. Cooperatively negotiating pairing information between the first wireless node and the wireless source device may be more efficient than the first wireless node spoofing the other devices since the wireless source device may be informed in advance of all the devices for which pairing information will be negotiated. In block 408, the first wireless node may receive and store pairing credentials for the selected wireless nodes. In an embodiment, such pairing information may be received sequentially (i.e., for each selected wireless node), while in another embodiment the wireless source device may transmit to the first wireless node a list, table or other data structure containing all of the pairing information in a single transmission. In block 410, the first wireless nodes may relay the pairing information/credentials to each selected wireless node over communication links that may be pre-negotiated (e.g., at the time to wireless node device was manufactured). The relayed information may include the same pairing information (e.g., name, address, link key, etc.) that would have been received by the selected wireless node if the pairing had been accomplished directly between the wireless source device and each of the wireless nodes.

Figure 4B:
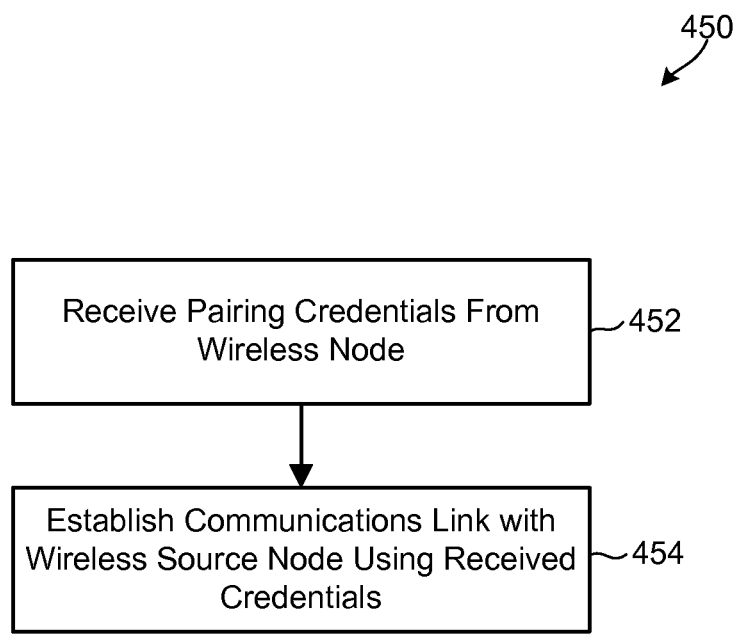
FIG. 4B is a process flow diagram of yet another embodiment wireless node method for pairing wireless devices with a third-party computing device.

FIG. 4B illustrates another embodiment method 450 by which wireless nodes receiving pairing information from a first wireless node may communicate with a wireless source device using the received information. In block 452, a second wireless node (e.g., a left or right earpiece) may receive pairing credentials from a first wireless node (e.g., a wrist display) that has negotiated a pairing with the wireless source device on behalf of the second wireless node as described above. In block 454, the second wireless node may then establish a communications link direct with the wireless source device (e.g., a cell phone) using the received credentials.

In an embodiment, the wireless nodes may be coupled in an advanced audio distribution profile (A2DP) configuration that supports frequency master/slave role changes. The A2DP protocol does not support two individual wireless nodes and only one device (referred to here as the "master") is visible to the phone at any given point in time. In such configuration, various embodiments may perform the pairing operations so that the master wireless node that advertizes the A2DP connection (e.g., wrist display) receives the information and retransmit the information to a slave wireless node (e.g., an earpiece). In these embodiments, all the wireless nodes remain paired to the third-party device, but since only one master is allowed to have an A2DP connection, the master relays the information to the others. That is, all the wireless nodes may remain paired, but since only one master is allowed to have an A2DP connection, the master relays the information to the other nodes.

As discussed above, short-range wireless technologies typically require that the devices first establish a "trust relationship" before they are allowed to connect to one another. This often requires that the user authenticate or pair the devices by inputting a code or number into a graphical user interface (GUI) of one or more of the devices. In various embodiments, the GUI of a first wireless-enabled device (e.g., phone) may be used to establish a trust relationship between a second wireless-enabled device (e.g., earpiece) and a third wireless-enabled device (e.g., wrist display). Such embodiments are particularly useful in circumstances in which a wireless node (e.g., left earpiece)—which may not have a screen capable of displaying a user-friendly GUI of a composite electronic device (e.g., wrist display pre-paired to left and right earpieces)—needs to be replaced, thus requiring new pairings between the composite electronic device and a new wireless node (e.g., replacement earpiece). In such circumstances, the various embodiments enable the user to perform the pairing using a larger or more user-friendly GUI of another wireless-enabled device in the system.

Figure 5:
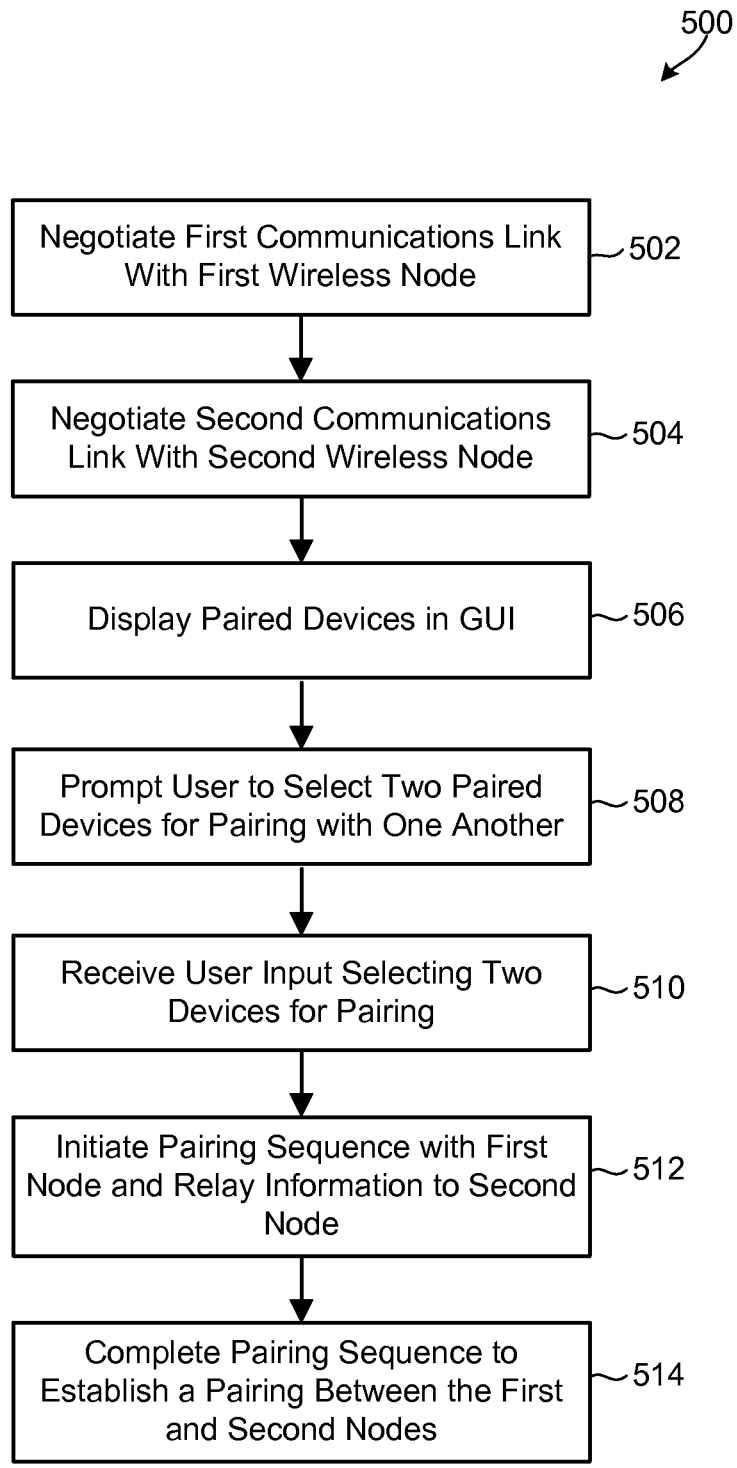
FIG. 5 is a process flow diagram of an embodiment wireless node method for pairing two devices on a graphical user interface (GUI) of a third device.

FIG. 5 illustrates an embodiment method 500 for performing a pairing operation between two devices using a graphical user interface (GUI) of a third device. In block 502, a wireless source node (e.g., cell phone) may negotiate a first pairing and/or communications link with a first wireless node (e.g., a wrist display) to establish a first wireless connection. In block 504, the wireless source node (e.g., a cell phone) may negotiate a second pairing and/or communications link with a second wireless node (e.g., a replacement earpiece) to establish a second wireless connection. In block 506, the wireless source node may detect all of the pairable devices that are in pairing range of the wireless source node (e.g., by receiving their pairing advertisement messages) and display the detected devices on a graphical user interface display. In block 508, the wireless source node may display a message prompting the user to select two devices for pairing from among the detected pairable devices. In block 510, the wireless source node may receive user input selecting the first wireless node (e.g., a wrist display) and the second wireless node (e.g., a replacement earpiece). In block 512, wireless source node may initiate the pairing sequence with the second wireless node, and relay the pairing information to the first wireless node. As part of block 512, the wireless source node may first request information from the first wireless node that enables the wireless source node to pretend to be the first wireless node, as discussed above with reference to FIGS. 3-4B. In block 514, the first and second wireless nodes may establish a trust relationship (i.e., pairing) using information relayed by the wireless source node that enables wireless communications between the first and second devices.

Figure 6:
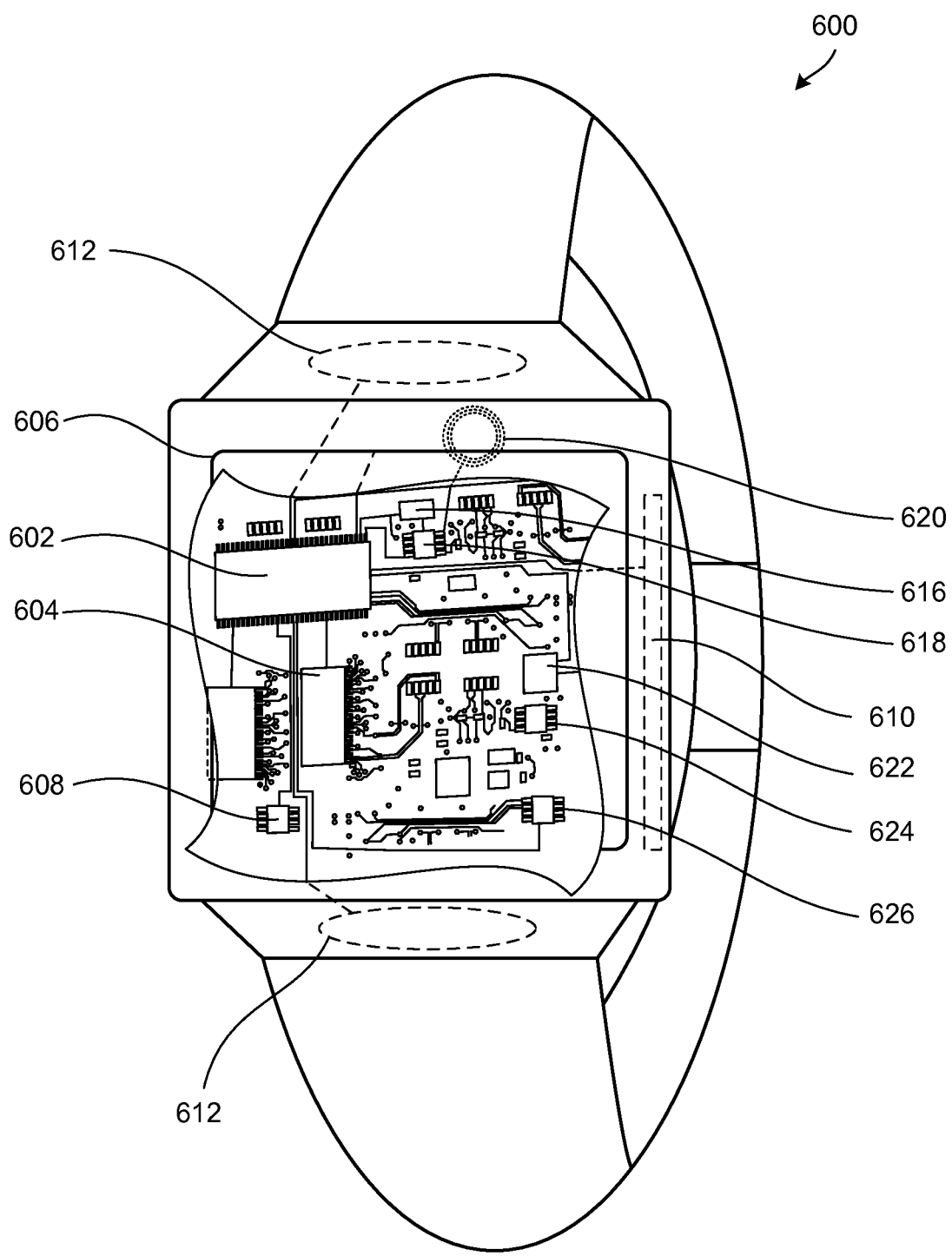
FIG. 6 is an illustration of a wireless wrist watch-type computing device suitable for use with the various embodiments.

The various embodiments described above may be implemented using a variety of wireless-enabled mobile computing devices, such as a wrist watch-type computing device ("wrist display") 600 illustrated in FIG. 6. A wrist display 600 may include a processor 602 coupled to a volatile and/or non-volatile internal memory 604, which may be secure and/or encrypted memories, unsecure and/or unencrypted memories, or any combination thereof. The processor 602 may also be coupled to an electronic display screen 606, which may be a touch screen display (e.g., resistive-sensing touch screen, capacitive-sensing touch screen infrared sensing touch screen, etc.). The wrist display 600 may have one or more radios (e.g., RF radio) and/or antennas 608 for sending and receiving electromagnetic radiation that may be connected to a wireless data link and coupled to the processor 602. The radios/antennas 608 may be used with the above-mentioned circuitry to implement the Bluetooth® protocol stack/interface (i.e., the wrist display 600 may be Bluetooth®-enabled).

The wrist display 600 may also include a slide sensor 610 and physical buttons 612 for receiving user inputs. The wrist display 600 may include a battery 616 coupled to an inductive charging circuit 618, and a coil antenna 620 which may be an inductive coil adapted to enable inductive charging of the battery 616. The battery 616 and inductive charging circuit 618 may be coupled to the processor 602 to enable the wrist display 600 to control inductive charging and generate messages via the coil antenna 620. The wrist display 600 may further include a vibratory motor 622, and various sensors, such as a temperature sensor 624 and accelerometer 626, all of which may be coupled to the processor 602.

Figure 7:
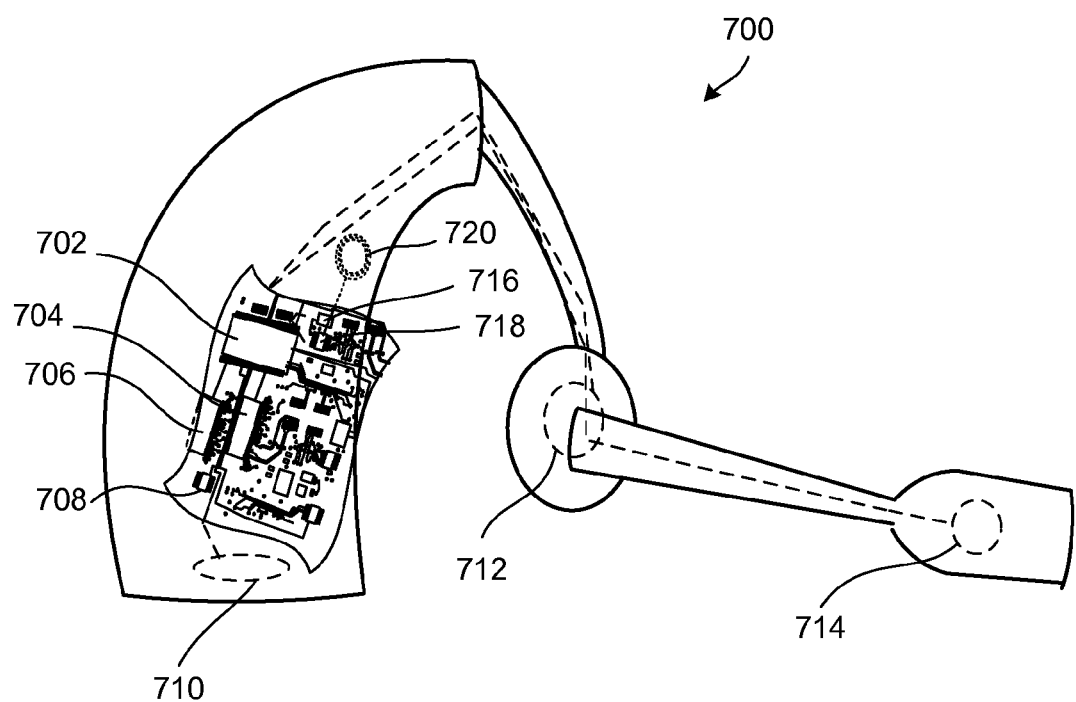
FIG. 7 is an illustration of a wireless earpiece suitable for use with the various embodiments.

Other examples of wireless-enabled mobile computing devices that may be used to implement the various embodiments described above include wireless earpieces, such as wireless earpiece 700 as illustrated in FIG. 7. A wireless earpiece 700 may include a processor 702 coupled to volatile or non-volatile internal memories 704 and 706. The wireless earpiece 700 may include one or more radios/antennas 708 for sending and receiving electromagnetic radiation that may be connected to a wireless data link and coupled to the processor 702. The radios/antennas 708 may be used with the above-mentioned circuitry to implement the Bluetooth® protocol stack/interface (i.e., the wireless earpiece 700 may be Bluetooth®-enabled).

The wireless earpiece 700 may also include one or more physical buttons 710 for receiving user inputs, a speaker 712 configured to generate an audio output, and a microphone 714 to receive audio input, all of which may be coupled to the processor 702. The wireless earpiece 700 may further include a battery 716 coupled to an inductive charging circuit 718, and a coil antenna 720 which may be an inductive coil adapted to enable inductive charging of the battery 716.

Various embodiments may include methods for pairing one or more wireless nodes with a source device in a wireless communication network, which may include negotiating a wireless pairing with the source device on behalf of a second wireless node and relaying pairing information relating to the wireless pairing from the first wireless node to the second wireless node. The relayed pairing information may include information that enables the second wireless node to communicate with the source device as if the second wireless node had directly negotiated the wireless pairing with the source device.

Various embodiments may include methods of pairing a first wireless node to a second wireless node, which may include negotiating a first wireless pairing between the first wireless node and a third wireless node, negotiating a second wireless pairing between the second wireless node and the third wireless node, displaying information identifying the first and second wireless nodes on a graphical user interface (GUI) of the third wireless node, receiving user input selecting the first and second wireless nodes on the GUI of the third wireless node, and in response to the user input, negotiating a third wireless pairing between the first and second wireless nodes. In an embodiment, negotiating a third wireless pairing between the first and second wireless nodes may include relaying pairing information relating to the third wireless pairing from the first wireless node to the second wireless node, the relayed pairing information enabling the second wireless node to communicate with the first wireless node as if the second wireless node had directly negotiated the third wireless pairing with the first wireless node.

Further embodiments may include a computing device having means for negotiating a wireless pairing with a source device on behalf of a wireless node and means for relaying pairing information relating to the wireless pairing to the wireless node, the relayed pairing information including information enabling the wireless node to communicate with the source device as if the wireless node had directly negotiated the wireless pairing with the source device. In an embodiment, means for negotiating a wireless pairing with a source device on behalf of a wireless node may include means for identifying the computing device to the source device as if the computing device were the wireless node, and means for negotiating the wireless pairing with the source device as if the computing device were the wireless node. In a further embodiment, means for negotiating a wireless pairing with a source device on behalf of a wireless node may include means for transmitting to the source device a data structure identifying a plurality of wireless nodes including the wireless node, means for receiving pairing information for each of the plurality of wireless nodes identified in the data structure, and means for transmitting to each of the plurality of wireless nodes identified in the data structure its respective pairing information. In a further embodiment, the computing device may include means for cooperating with the source device to negotiate pairing information for each of the plurality of wireless nodes identified in the data structure. In a further embodiment, means for negotiating a wireless pairing with a source device on behalf of a wireless node may include means for negotiating a Bluetooth® wireless pairing. In a further embodiment, the computing device may be a Bluetooth®-enabled wrist display, and the source device may be a Bluetooth®-enabled mobile phone. In a further embodiment, the wireless node may be a Bluetooth®-enabled wireless earpiece.

Further embodiments may include a computing device having a memory and a processor coupled to the memory, the processor being configured with processor-executable instructions to perform operations that may include negotiating a wireless pairing with a source device on behalf of a wireless node and relaying pairing information relating to the wireless pairing to the wireless node, the relayed pairing information including information enabling the wireless node to communicate with the source device as if the wireless node had directly negotiated the wireless pairing with the source device. In an embodiment, the processor may be configured with processor-executable instructions such that negotiating a wireless pairing with a source device on behalf of a wireless node may include identifying the computing device to the source device as being the wireless node, and negotiating the wireless pairing with the source device as if the computing device were the wireless node. In a further embodiment, in which the processor may be configured with processor-executable instructions such that negotiating a wireless pairing with a source device on behalf of a wireless node may include transmitting to the source device a data structure identifying a plurality of wireless nodes including the wireless node, receiving pairing information for each of the plurality of wireless nodes identified in the data structure, and transmitting to each of the plurality of wireless nodes identified in the data structure its respective pairing information. In a further embodiment, the processor may be configured with processor-executable instructions to perform operations further including cooperating with the source device to negotiate pairing information for each of the plurality of wireless nodes identified in the data structure. In a further embodiment, the processor may be configured with processor-executable instructions such that negotiating a wireless pairing with a source device on behalf of a wireless node may include negotiating a Bluetooth® wireless pairing. In a further embodiment, the computing device may be a Bluetooth®-enabled wrist display and the source device may be a Bluetooth®-enabled mobile phone. In a further embodiment, the wireless node may be a Bluetooth®-enabled wireless earpiece.

Further embodiments may include a non-transitory processor-readable storage medium having stored thereon processor-executable software instructions configured to cause a processor of a first wireless node to perform operations for pairing one or more wireless nodes with a source device in a wireless communication network. The operations may include negotiating, between the first wireless node and the source device, a wireless pairing with the source device on behalf of a second wireless node, and relaying pairing information relating to the wireless pairing from the first wireless node to the second wireless node, the relayed pairing information including information enabling the second wireless node to communicate with the source device as if the second wireless node had directly negotiated the wireless pairing with the source device. In an embodiment, the stored processor-executable software instructions may be configured to cause a processor of a first wireless node to perform operations such that negotiating a wireless pairing with the source device on behalf of a second wireless node may include identifying the first wireless node to the source device as the second wireless node, and negotiating the wireless pairing with the source device as if the first wireless node were the second wireless node. In a further embodiment, the stored processor-executable software instructions may be configured to cause a processor of a first wireless node to perform operations such that negotiating a wireless pairing with the source device on behalf of a second wireless node may include transmitting to the source device a data structure identifying a plurality of wireless nodes including the second wireless node, receiving pairing information for the plurality of wireless nodes identified in the data structure, and transmitting to each of the plurality of wireless nodes identified in the data structure its respective pairing information. In a further embodiment, the stored processor-executable software instructions may be configured to cause a processor of a first wireless node to perform operations including cooperatively negotiating pairing information for each of the plurality of wireless nodes identified in the data structure. In a further embodiment, the stored processor-executable software instructions may be configured to cause a processor of a first wireless node to perform operations such that negotiating a wireless pairing with the source device on behalf of a second wireless node may include negotiating a Bluetooth® wireless pairing. In a further embodiment, the stored processor-executable software instructions may be configured to be executed by a processor of a Bluetooth®-enabled wrist display, and in which the source device may be a Bluetooth®-enabled mobile phone. In a further embodiment, the second wireless node may be a Bluetooth®-enabled wireless earpiece.

Further embodiments may include a communication system, including a first wireless node, a second wireless node, a third wireless node, means for negotiating a first wireless pairing between the first wireless node and a third wireless node, means for negotiating a second wireless pairing between the second wireless node and the third wireless node, means for displaying information identifying the first and second wireless nodes on a graphical user interface (GUI) of the third wireless node, means for receiving user input selecting the first and second wireless nodes on the GUI of the third wireless node, and means for negotiating a third wireless pairing between the first and second wireless nodes in response to the user input. In an embodiment, means for negotiating a third wireless pairing between the first and second wireless nodes may include means for relaying pairing information relating to the third wireless pairing from the first wireless node to the second wireless node that enables the second wireless node to communicate with the first wireless node as if the second wireless node had directly negotiated the third wireless pairing with the first wireless node.

Further embodiments include a communication system that may include a first wireless node including a first processor coupled to a memory, a second wireless node including a second processor coupled to the memory, and a third wireless node, including a graphical user interface (GUI), and a third processor coupled to the memory and the GUI, in which the first and third processors may be configured with processor-executable instructions to perform operations including negotiating a first wireless pairing between the first wireless node and the third wireless node, in which the second and third processors may be configured with processor-executable instructions to perform operations including negotiating a second wireless pairing between the second wireless node and the third wireless node, in which the third processor may be configured with processor-executable instructions to perform operations including displaying information identifying the first and second wireless nodes on a graphical user interface (GUI) of the third wireless node, and receiving user input selecting the first and second wireless nodes on the GUI of the third wireless node, and in which the first and second processors may be configured with processor-executable instructions to, in response to the user input, perform operations including negotiating a third wireless pairing between the first and second wireless nodes by relaying pairing information relating to the third wireless pairing from the first wireless node to the second wireless node that enables the second wireless node to communicate with the first wireless node as if the second wireless node had directly negotiated the third wireless pairing with the first wireless node. The various embodiments include methods for simultaneously pairing two or more wireless nodes with a single source device in a wireless communication network.

Further embodiments include a method for pairing a first wireless node to a second wireless node that may include negotiating a first wireless pairing between the first wireless node and a third wireless node, negotiating a second wireless pairing between the second wireless node and the third wireless node, displaying information identifying the first and second wireless nodes on a graphical user interface (GUI) of the third wireless node, receiving user input selecting the first and second wireless nodes on the GUI of the third wireless node, and negotiating a third wireless pairing between the first and second wireless nodes. In an embodiment, negotiating a third wireless pairing between the first and second wireless nodes may include relaying pairing information relating to the third wireless pairing from the first wireless node to the second wireless node, in which the relayed pairing information enables the second wireless node to communicate with the first wireless node as if the second wireless node had directly negotiated the third wireless pairing with the first wireless node.

Figure 8:
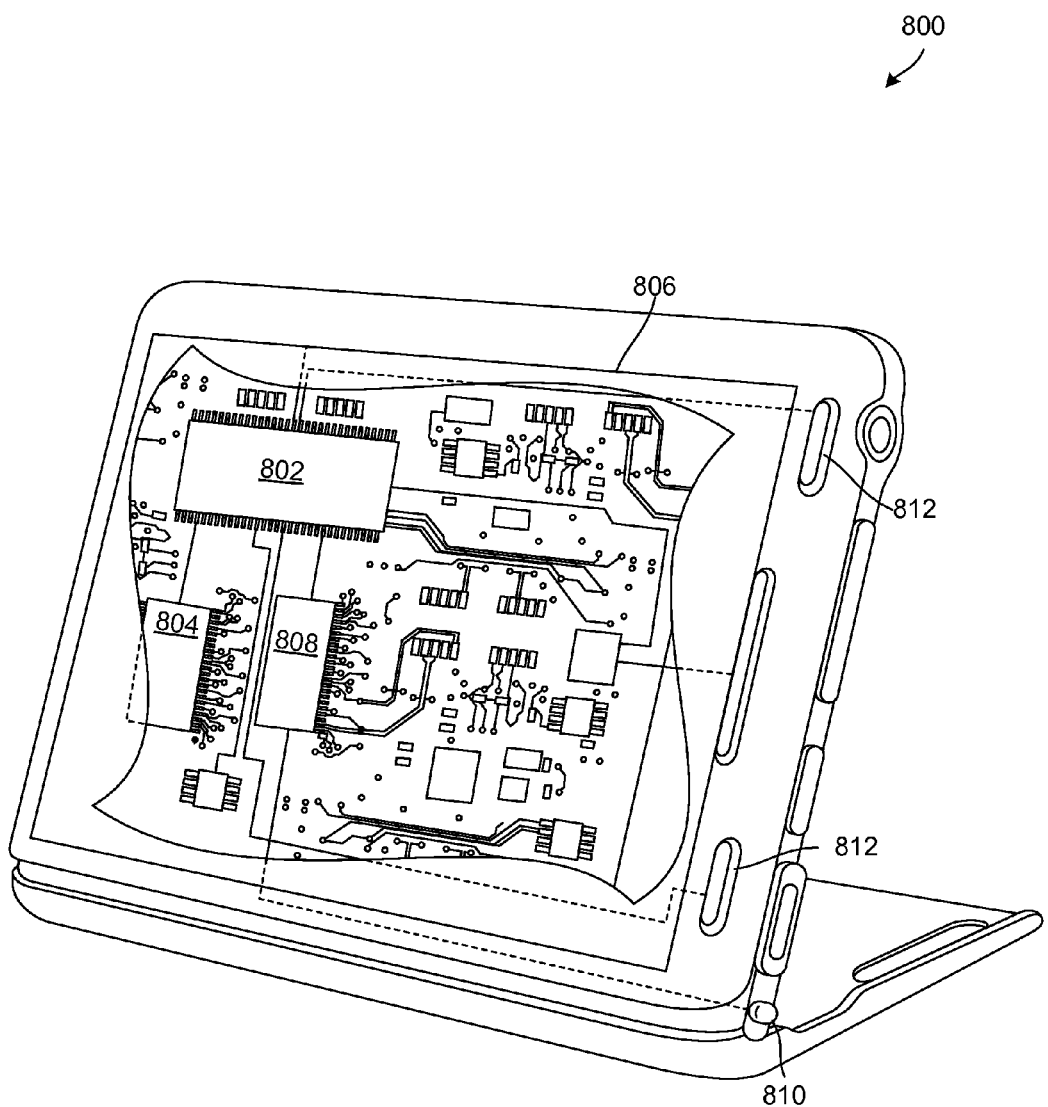
FIG. 8 is an illustration of an example mobile device suitable for use with the various embodiments.
Figure 9:
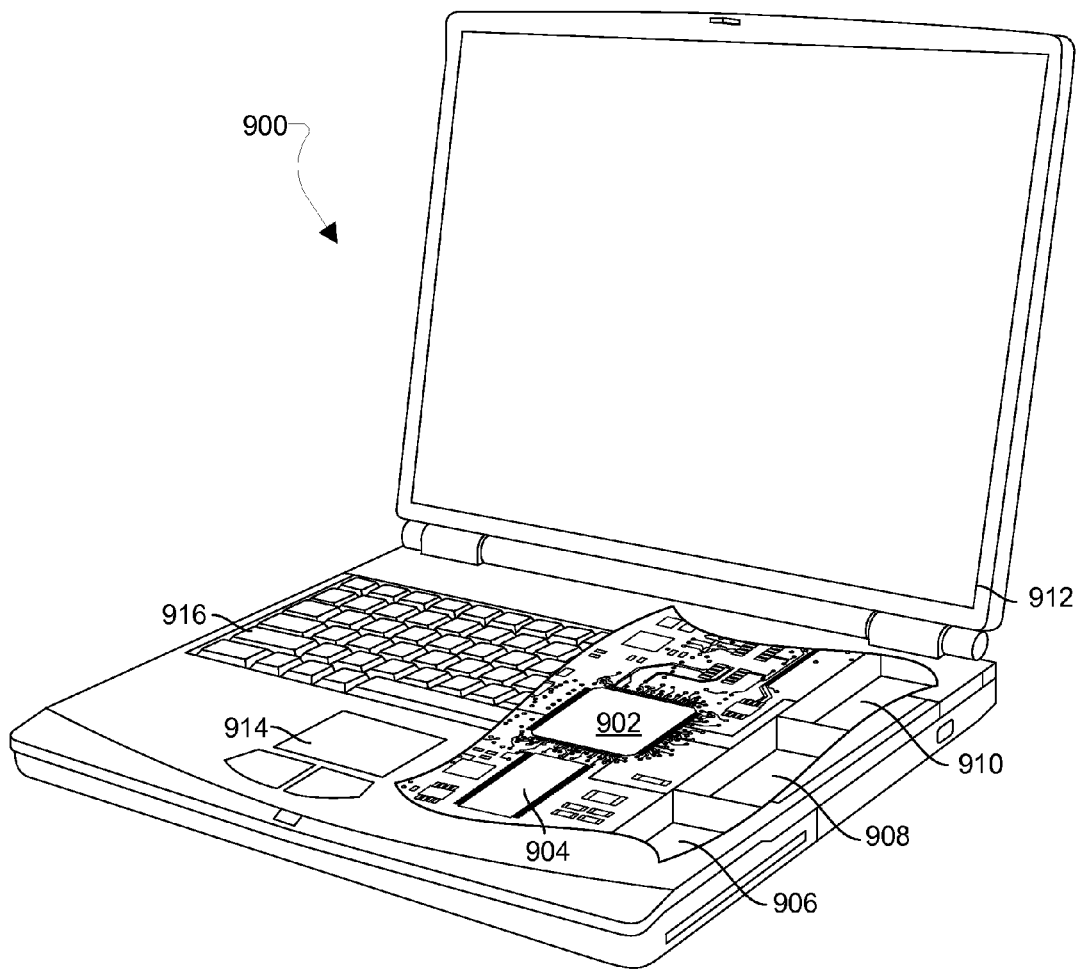
FIG. 9 is an illustration of an example laptop computer suitable for use with the various embodiments.

The various embodiments may also be implemented using any commercial computing devices having an RF radio, examples of which are illustrated in FIGS. 8 and 9. Typical mobile computing devices 800 will have in common the components illustrated in FIG. 8. For example, mobile computing devices 800 may include a processor 802 coupled to an internal memory 804 and a touch surface input device/display 806, such as a resistive sensing touchscreen, capacitive sensing touchscreen, infrared sensing touchscreen, acoustic/piezoelectric sensing touchscreen, or the like. The computing device 800 may have a radio/antenna 810 for sending and receiving electromagnetic radiation that is connected to a wireless data link and/or cellular telephone transceiver 808 coupled to the processor 802. Computing devices 800 may also include physical buttons 812 for receiving user inputs.

Other forms of computing devices, including personal computers and laptop computers, may be used to implementing the various embodiments. Such computing devices typically include the components illustrated in FIG. 9 which illustrates an example personal laptop computer 900. Such a personal computer 900 generally includes a processor 902 coupled to volatile memory 904 and a large capacity nonvolatile memory, such as a disk drive 906. The computer 900 may also include a compact disc (CD) and/or DVD drive 908 coupled to the processor 902. The computer device 900 may also include a number of connector ports coupled to the processor 902 for establishing data connections or receiving external memory devices, such as a network connection circuit for coupling the processor 902 to a network. The computing device 900 may have a radio/antenna 910 for sending and receiving electromagnetic radiation that is connected to a wireless data link coupled to the processor 902. The computer 900 may further be coupled to a keyboard 916, a pointing device such as a mouse 914, and a display 912 as is well known in the computer arts.

The processors 602, 702, 802, 902 may be any programmable microprocessor, microcomputer or multiple processor chip or chips that may be configured by software instructions (applications) to perform a variety of functions, including the functions of the various embodiments described herein. Multiple processors may be provided, such as one processor dedicated to wireless communication functions and one processor dedicated to running other applications. Typically, software applications may be stored in the internal memory before they are accessed and loaded into the processor 602, 702, 802, 902. In some devices, the processor 602, 702, 802, 902 may include internal memory sufficient to store the application software instructions. In some mobile devices, the secure memory may be in a separate memory chip coupled to the processor 602, 702, 802, 902. The internal memory may be a volatile or nonvolatile memory, such as flash memory, or a mixture of both. For the purposes of this description, a general reference to memory refers to all memory accessible by the processor, including internal memory, removable memory plugged into the device, and memory within the processor 602, 702, 802, 902 itself.

The foregoing method descriptions and the process flow diagrams are provided merely as illustrative examples and are not intended to require or imply that the blocks of the various embodiments must be performed in the order presented. As will be appreciated by one of skill in the art the order of steps or blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps/blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory computer-readable or processor-readable storage medium. The blocks of a method or algorithm disclosed herein may be embodied in a processor-executable software module which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for pairing one or more wireless nodes with a source device in a wireless communication network, comprising:
negotiating, between a first wireless node and the source device, a completed wireless pairing sequence with the source device on behalf of a second wireless node; and
relaying pairing information relating to the completed wireless pairing sequence from the first wireless node to the second wireless node, wherein the relayed pairing information enables the second wireless node to communicate with the source device as if the second wireless node had directly negotiated the completed wireless pairing sequence with the source device.

2. The method of claim 1, further comprising:
establishing a wireless communications link between the second wireless node and the source device using the relayed pairing information.

3. The method of claim 1, wherein negotiating a completed wireless pairing sequence with the source device on behalf of a second wireless node comprises:
the first wireless node identifying itself to the source device as being the second wireless node; and
the first wireless node negotiating the completed wireless pairing sequence with the source device as if the first wireless node were the second wireless node.

4. The method of claim 1, wherein negotiating a completed wireless pairing sequence with the source device on behalf of a second wireless node comprises:
the first wireless node transmitting to the source device a data structure identifying a plurality of wireless nodes including the second wireless node;
the first wireless node receiving pairing information for each of the plurality of wireless nodes identified in the data structure; and
the first wireless node transmitting to each of the plurality of wireless nodes identified in the data structure its respective pairing information.

5. The method of claim 4, further comprising the first wireless node and the source device cooperating in negotiating pairing information for each of the plurality of wireless nodes identified in the data structure.

6. The method of claim 1, wherein negotiating a completed wireless pairing sequence with the source device on behalf of a second wireless node comprises negotiating a completed Bluetooth® wireless pairing sequence.

7. A method for pairing one or more wireless nodes with a source device in a wireless communication network, comprising:
negotiating, between a first wireless node and the source device, a completed wireless pairing with the source device on behalf of a second wireless node; and
relaying pairing information relating to the completed wireless pairing from the first wireless node to the second wireless node, wherein the relayed pairing information enables the second wireless node to communicate with the source device as if the second wireless node had directly negotiated the completed wireless pairing with the source device;
wherein the first wireless node is a Bluetooth®-enabled wrist display and the source device is a Bluetooth®-enabled mobile phone;
wherein the second wireless node is a Bluetooth®-enabled wireless earpiece.

8. A computing device, comprising:
a processor configured with processor-executable instructions to:
negotiate, by the computing device, a completed wireless pairing sequence with a source device on behalf of a wireless node; and
relay, by the computing device, after negotiating the wireless pairing sequence to completion with the source device on behalf of the wireless node, pairing information relating to the completed wireless pairing sequence to the wireless node, the relayed pairing information including information enabling the wireless node to communicate with the source device as if the wireless node had directly negotiated the completed wireless pairing sequence with the source device.

9. The computing device of claim 8, wherein the processor is configured with processor-executable instructions such that negotiating a completed wireless pairing sequence with a source device on behalf of a wireless node comprises:
identifying the computing device to the source device as being the wireless node; and
negotiating the completed wireless pairing sequence with the source device as if the computing device were the wireless node.

10. The computing device of claim 8, wherein the processor is configured with processor-executable instructions such that negotiating a completed wireless pairing sequence with a source device on behalf of a wireless node comprises:
transmitting to the source device a data structure identifying a plurality of wireless nodes including the wireless node;
receiving pairing information for each of the plurality of wireless nodes identified in the data structure; and
transmitting to each of the plurality of wireless nodes identified in the data structure its respective pairing information.

11. The computing device of claim 10, wherein the processor is further configured with processor-executable instructions to:
cooperate with the source device to negotiate pairing information for each of the plurality of wireless nodes identified in the data structure.

12. The computing device of claim 8, wherein the processor is configured with processor-executable instructions such that negotiating a completed wireless pairing sequence with a source device on behalf of a wireless node comprises negotiating a completed Bluetooth® wireless pairing sequence.

13. A non-transitory processor-readable storage medium having stored thereon processor-executable software instructions configured to cause a processor of a first wireless node to perform operations for pairing one or more wireless nodes with a source device in a wireless communication network, the operations comprising:
negotiating, between the first wireless node and the source device, a completed wireless pairing sequence with the source device on behalf of a second wireless node; and
relaying pairing information relating to the completed wireless pairing sequence from the first wireless node to the second wireless node, the relayed pairing information including information enabling the second wireless node to communicate with the source device as if the second wireless node had directly negotiated the completed wireless pairing sequence with the source device.

14. The non-transitory processor-readable storage medium of claim 13, wherein the stored processor-executable software instructions are configured to cause a processor of a first wireless node to perform operations such that negotiating a completed wireless pairing sequence with the source device on behalf of a second wireless node comprises:
identifying the first wireless node to the source device as the second wireless node; and
negotiating the completed wireless pairing sequence with the source device as if the first wireless node were the second wireless node.

15. The non-transitory processor-readable storage medium of claim 13, wherein the stored processor-executable software instructions are configured to cause a processor of a first wireless node to perform operations such that negotiating a completed wireless pairing sequence with the source device on behalf of a second wireless node comprises:
    transmitting to the source device a data structure identifying a plurality of wireless nodes including the second wireless node;
    receiving pairing information for the plurality of wireless nodes identified in the data structure; and
    transmitting to each of the plurality of wireless nodes identified in the data structure its respective pairing information.

16. The non-transitory processor-readable storage medium of claim 15, wherein the stored processor-executable software instructions are configured to cause a processor of a first wireless node to perform operations comprising cooperatively negotiating pairing information for each of the plurality of wireless nodes identified in the data structure.

17. The non-transitory processor-readable storage medium of claim 13, wherein the stored processor-executable software instructions are configured to cause a processor of a first wireless node to perform operations such that negotiating a completed wireless pairing sequence with the source device on behalf of a second wireless node comprises negotiating a completed Bluetooth® wireless pairing sequence.

18. A non-transitory processor-readable storage medium having stored thereon processor-executable software instructions configured to cause a processor of a first wireless node to perform operations for pairing one or more wireless nodes with a source device in a wireless communication network, the operations comprising:
    negotiating, between the first wireless node and the source device, a completed wireless pairing with the source device on behalf of a second wireless node; and
    relaying pairing information relating to the completed wireless pairing from the first wireless node to the second wireless node, the relayed pairing information including information enabling the second wireless node to communicate with the source device as if the second wireless node had directly negotiated the completed wireless pairing with the source device;
    wherein the stored processor-executable software instructions are configured to be executed by a processor of a Bluetooth®-enabled wrist display, and wherein the source device is a Bluetooth®-enabled mobile phone;
    wherein the second wireless node is a Bluetooth®-enabled wireless earpiece.

19. A method for pairing a first wireless node to a second wireless node, comprising:
    negotiating a first wireless pairing between the first wireless node and a third wireless node;
    negotiating a second wireless pairing between the second wireless node and the third wireless node;
    displaying information identifying the first and second wireless nodes on a graphical user interface (GUI) of the third wireless node;
    receiving user input selecting the first and second wireless nodes on the GUI of the third wireless node; and
    in response to the user input, negotiating a third completed wireless pairing sequence between the first and second wireless nodes.

20. The method of claim 19, wherein negotiating a third completed wireless pairing sequence between the first and second wireless nodes comprises relaying pairing information relating to the third completed wireless pairing sequence from the first wireless node to the second wireless node, the relayed pairing information enabling the second wireless node to communicate with the first wireless node as if the second wireless node had directly negotiated the third completed wireless pairing sequence with the first wireless node.

21. A communication system, comprising:
    a first wireless node;
    a second wireless node;
    a third wireless node;
    means for negotiating a first wireless pairing between the first wireless node and the third wireless node;
    means for negotiating a second wireless pairing between the second wireless node and the third wireless node;
    means for displaying information identifying the first and second wireless nodes on a graphical user interface (GUI) of the third wireless node;
    means for receiving user input selecting the first and second wireless nodes on the GUI of the third wireless node; and
    means for negotiating a third completed wireless pairing sequence between the first and second wireless nodes in response to the user input.

22. The communication system of claim 21, wherein means for negotiating a third completed wireless pairing sequence between the first and second wireless nodes comprises means for relaying pairing information relating to the third completed wireless pairing sequence from the first wireless node to the second wireless node that enables the second wireless node to communicate with the first wireless node as if the second wireless node had directly negotiated the third completed wireless pairing sequence with the first wireless node.

23. A communication system, comprising:
    a first wireless node comprising a first processor;
    a second wireless node comprising a second processor; and
    a third wireless node, comprising:
    a graphical user interface (GUI); and
    a third processor coupled the GUI,
    wherein the first and third processors are configured with processor-executable instructions to negotiate a first wireless pairing between the first wireless node and the third wireless node,
    wherein the second and third processors are configured with processor-executable instructions to negotiate a second wireless pairing between the second wireless node and the third wireless node,
    wherein the third processor is configured with processor-executable instructions to:
    display information identifying the first and second wireless nodes on the graphical user interface (GUI) of the third wireless node; and
    receive user input selecting the first and second wireless nodes on the GUI of the third wireless node; and
    wherein the first and second processors are configured with processor-executable instructions to, in response to the user input, negotiate a third completed wireless pairing sequence between the first and second wireless nodes by relaying pairing information relating to the third completed wireless pairing sequence from the first wireless node to the second wireless node that enables the second wireless node to communicate with the first wireless node as if the second wireless node had directly negotiated the third completed wireless pairing sequence with the first wireless node.

24. A method for pairing one or more wireless nodes with a mobile phone in a wireless communication network, comprising:
    by a wrist display, negotiating to completion a wireless pairing with the mobile phone on behalf of a wireless node; and by the wrist display, after negotiating to completion the wireless pairing with the mobile phone on behalf of the wireless node, relaying pairing information relating to the negotiated wireless pairing to the wireless node, wherein the relayed pairing information enables the wireless node to communicate with the mobile phone as if the wireless node had directly negotiated the wireless pairing with the mobile phone.

25. The method of claim 24, wherein the wireless node, on whose behalf the wrist display negotiated to completion the wireless pairing with the mobile phone, is a wireless earpiece.

26. A wrist display comprising:

a processor configured with processor-executable instructions to:

negotiate, by the wrist display, to completion a wireless pairing with a mobile phone on behalf of a wireless node; and relay, by the wrist display, after negotiating to completion the wireless pairing with the mobile phone on behalf of the wireless node, pairing information relating to the negotiated wireless pairing to the wireless node, wherein the relayed pairing information enables the wireless node to communicate with the mobile phone as if the wireless node had directly negotiated the wireless pairing with the mobile phone.

27. The wrist display of claim 26, wherein the wireless node, on whose behalf the wrist display negotiated to completion the wireless pairing with the mobile phone, is a wireless earpiece.

* * * * *